(12) United States Patent
Hamkens

(10) Patent No.: US 7,798,688 B2
(45) Date of Patent: Sep. 21, 2010

(54) HEADLIGHT LENS FOR A MOTOR VEHICLE

(75) Inventor: Jan Heiko Hamkens, Berlin (DE)

(73) Assignee: Docter Optics GmbH (DE)

(*) Notice: Subject to any disclaimer, the term of this patent is extended or adjusted under 35 U.S.C. 154(b) by 230 days.

(21) Appl. No.: 12/281,094

(22) PCT Filed: Jan. 25, 2007

(86) PCT No.: PCT/DE2007/000158

§ 371 (c)(1),
(2), (4) Date: Aug. 28, 2008

(87) PCT Pub. No.: WO2007/121695

PCT Pub. Date: Nov. 1, 2007

(65) Prior Publication Data

US 2009/0034281 A1    Feb. 5, 2009

(30) Foreign Application Priority Data

Apr. 24, 2006 (DE) .................. 10 2006 019 399

(51) Int. Cl.
*F21V 5/00* (2006.01)
(52) U.S. Cl. ..................... 362/520; 362/539
(58) Field of Classification Search .............. 362/507, 362/520, 539
See application file for complete search history.

(56) References Cited

U.S. PATENT DOCUMENTS

2006/0050523 A1* 3/2006 Schmidt ............... 362/510

FOREIGN PATENT DOCUMENTS

| DE | 3123908 | A1 | 1/1983 |
|----|---------|----|--------|
| DE | 69400212 | T2 | 1/1997 |
| DE | 102004011104 | A1 | 9/2005 |
| DE | 102005009556 | A1 | 9/2005 |
| DE | 102004024107 | A1 | 12/2005 |
| EP | 1584863 | | 10/2005 |
| GB | 835820 | | 5/1960 |
| WO | 2004/096724 | A1 | 11/2004 |

OTHER PUBLICATIONS

"Ionenaustausch" R. Weiβmann. pp. 121-126 Oberflachenveredelung von Glas/Huttentechnische Vereinigung der Deutschen Glasindustrie/Fortbildungskurs 2003.
PCT International Search Report for PCT/EP2007/000158 completed by the EP Searching Authority on Jun. 29, 2007.

* cited by examiner

*Primary Examiner*—David V Bruce
(74) *Attorney, Agent, or Firm*—Barnes & Thornburg LLP

(57) ABSTRACT

The invention relates to a headlight lens for a vehicle headlight comprising a light source, particularly for a motor vehicle headlight, wherein the headlight lens comprises a transparent lens body made of glass comprising a surface arranged to face the light source and a surface arranged to face away from the light source, and wherein the headlight lens comprises at least with respect to said surface arranged to face away from the light source a layer comprising an aluminum concentration which is higher than an aluminum concentration inside the lens body and/or a sodium concentration which is lower than a sodium concentration inside the lens body.

25 Claims, 3 Drawing Sheets

HEADLIGHT LENS FOR A MOTOR VEHICLE

This application is a U.S. national counterpart application of international application serial No. PCT/DE2007/000158 filed Jan. 25, 2007, which claims priority to German Patent Application No. 102006019399.7 filed Apr. 24, 2006.

TECHNICAL FIELD

The present invention relates to a headlight lens for a motor vehicle headlight and a method of producing a headlight lens for a motor vehicle headlight consisting substantially of glass.

BACKGROUND

It is an object of the invention to design a headlight lens for a motor vehicle headlight such that it offers an optically attractive design and simultaneously meets high photometric requirements. Herein headlight lenses for motor vehicle headlights should have a high brilliance and be colorless with regard to their optical appearance. For this purpose headlight lenses are partially polished mechanically. An alternative solution is offered according to a method of chemically polishing glass in a polishing bath comprising a mixture of sulphuric acid-hydrofluoric acid, wherein the hydrofluoric acid has a concentration of less than 1 mass-% HF and the amount of sulphuric acid in the polishing bath is less than 60 mass-% $H_2SO_4$, as disclosed in DE 31 23 908 A1.

It is desirable to achieve the above object such that the costs for a headlight lens for a motor vehicle headlight do not raise significantly.

SUMMARY

The above object is achieved by a headlight lens for a vehicle headlight including a light source, and more particularly a motor vehicle headlight, wherein the headlight lens comprises a transparent lens body made of glass comprising a surface arranged to face the light source and a surface arranged to face away from the light source, and wherein at least the surface arranged to face away from the light source includes a layer comprising an aluminum concentration which is higher than an aluminum concentration inside the lens body and/or a sodium concentration which is lower than a sodium concentration inside the lens body. Herein the surface arranged to face away from the light source is particularly curved convexly and/or the surface arranged to face the light source is substantially plane. Alternatively the above object is achieved by a headlight lens for a vehicle headlight, more particularly a motor vehicle headlight, wherein the headlight lens comprises a transparent lens body made of glass including a substantially plane surface and a convexly curved surface, and wherein at least the convexly curved surface includes a layer comprising an aluminum concentration which is higher than an aluminum concentration inside the lens body and/or a sodium concentration which is lower than a sodium concentration inside the lens body. The layer thickness is advantageously in the range between about 50 nm and 300 nm.

In one embodiment of the invention the headlight lens is blank molded at least on one side. Herein particularly the surface arranged to face away from the light source or the convexly curved surface, respectively, is blank molded. Preferably the headlight lens is blank molded on both sides. In the sense of the present invention blank molding means particularly pressing a headlight lens in such a way that after the pressing process a post-treatment of an optically effective surface of the headlight lens, especially its contour, can be dispensed with.

In another embodiment of the invention the glass comprises $Na_2O$. In a further embodiment of the invention the glass comprises 2 to 15 weight-% $Na_2O$. In a further embodiment of the invention the glass comprises 50 to 75 weight-% $SiO_2$. In a yet further embodiment of the invention the glass comprises 50 to 75 weight-% $SiO_2$,
2 to 15 weight-% $Na_2O$,
5 to 15 weight-% $K_2O$,
3 to 12 weight-% $CaO$,
0 to 10 weight-% $B_2O_3$,
0 to 5 weight-% $Al_2O_3$,
0 to 5 weight-% $Li_2O$,
0 to 5 weight-% $MgO$,
0 to 7 weight-% $SrO$,
0 to 7 weight-% $ZnO$,
0 to 8 weight-% $TiO_2$,
0 to 5 weight-% $ZrO_2$,
0.1 to 5 weight-% $Nb_2O_5$,
0 to 5 weight-% $Ta_2O_5$, and
0 to 2 weight-% F.

In a further embodiment of the invention the sum of the amounts of $TiO_2$, $ZrO_2$, $Nb_2O_5$ and $Ta_2O_5$ is between 0.3 and 12 weight-%. In a further embodiment of the invention the sum of the amounts of alkalis is more than 15 weight-%. In a further embodiment of the invention the glass comprises 0 to 2 weight-% PbO. In a still further embodiment of the invention the glass comprises 0 to 2 weight-% BaO.

In a further embodiment of the invention the glass comprises about 13 to 16 weight-% $Na_2O$. In a further embodiment of the invention the glass comprises so called window glass, wherein the glass comprises about 71 to 73 weight-% $SiO_2$,
13 to 16 weight-% $Na_2O$,
0 to 1 weight-% $K_2O$,
6.5 to 12 weight-% $CaO$,
0 to 1.8 weight-% $Al_2O_3$, and
2 to 4.5 weight-% $MgO$.

In a further embodiment it can be contemplated that the optically effective surface of the headlight lens comprises in a substantial part (or approximately) a roughness of less than 0.05 µm, especially for a light transmission of at least 90% at the surface. However, sub-areas can comprise a higher roughness. These sub-areas comprising a higher roughness are particularly formed as disclosed in DE 10 2005 009 556 A1. Roughness in the sense of the invention particularly should be defined according to ISO 4287 as $R_a$.

In a further embodiment it can be contemplated to stamp an emblem, particularly at the surface of the headlight lens arranged to be faced to the light source. Such an emblem is advantageously formed according to an emblem disclosed in DE 10 2004 011 104 A1.

It can also be contemplated to provide in connection with the headlight lens at the surface of the headlight lens arranged to be faced to the light source particularly a blank molded deformation or embossment for deflection of a part of the light producible from the light source in a sub illumination area outside a principal illumination area of the light source. The deformation or embossment can be formed according to a deformation or embossment disclosed in DE 10 2004 024 107 A1. In a preferred embodiment at least 95%, particularly at least 97% of the light emittable or emitting from the headlight lens impinge on the principal illumination area. In a further embodiment less than 5%, particularly less than 3%, but preferably at least 0.2%, particularly at least 0.5% of the light emittable or emitting from the headlight lens impinge on the sub illumination area. By means of the sub illumination area, for example, traffic signs can be illuminated. The principal illumination area and the sub illumination area are to be considered as separate areas, if an unlighted area is disposed between them. In this unlighted area the light intensity is nearly zero or negligible small.

The above object is also achieved by a method of producing a headlight lens for a vehicle headlight consisting substantially of glass, particularly a headlight lens comprising one or more of the above mentioned features, wherein the headlight lens is blank molded, particularly on both sides, and then cooled, particularly controlled and/or with supply of heat and/or in a cooling zone, wherein the headlight lens during the cooling process is overflowed with a gas containing sulphur, chlorine, fluorine, iron and/or aluminum. Herein the gas can include for example $SO_2$, HCl or $CF_4$—as disclosed in advanced education course 2003 "Oberflächenveredelung von Glas", Hüttentechnische Vereinigung der Deutschen Glasindustrie—or $AlCl_3$—as disclosed in WO 2004/096724 A1. Moreover it can be contemplated that the gas additionally comprises $H_2O$. Appropriate methods for overflowing with gas can be learned from advanced education course 2003 "Oberflächenveredelung von Glas", Hüttentechnische Vereinigung der Deutschen Glasindustrie, WO 2004/096724 A1 and DE 694 00 212 T2. Overflowing with gas in the sense of the invention should particularly also comprise evaporation. During overflowing with gas the surface temperature of the headlight lens preferably is in the range between 450° C. and 550° C.

In an embodiment of the invention the gas is sucked off. In a further embodiment of the invention the glass comprises $Na_2O$. In a further embodiment of the invention the glass comprises 2 to 15 weight-% $Na_2O$. In a further embodiment of the invention the glass comprises 50 to 75 weight-% $SiO_2$. In another embodiment the invention the glass comprises 50 to 75 weight-% $SiO_2$,
2 to 15 weight-% $Na_2O$,
5 to 15 weight-% $K_2O$,
3 to 12 weight-% CaO,
0 to 10 weight-% $B_2O_3$,
0 to 5 weight-% $Al_2O_3$,
0 to 5 weight-% $Li_2O$,
0 to 5 weight-% MgO,
0 to 7 weight-% SrO,
0 to 7 weight-% ZnO,
0 to 8 weight-% $TiO_2$,
0 to 5 weight-% $ZrO_2$,
0.1 to 5 weight-% $Nb_2O_5$,
0 to 5 weight-% $Ta_2O_5$, and
0 to 2 weight-% F.

In a further embodiment of the invention the sum of the amounts of $TiO_2$, $ZrO_2$, $Nb_2O_5$ and $Ta_2O_5$ is between 0.3 and 12 weight-%. In a further embodiment of the invention the sum of the amounts of alkalis is more than 15 weight-%. In a further embodiment of the invention the glass comprises 0 to 2 weight-% PbO. In a still further embodiment of the invention the glass comprises 0 to 2 weight-% BaO.

In a further embodiment of the invention the glass comprises about 13 to 16 weight-% $Na_2O$. In a further embodiment of the invention the glass comprises so called window glass, wherein the glass comprises about 71 to 73 weight-% $SiO_2$,
13 to 16 weight-% $Na_2O$,
0 to 1 weight-% $K_2O$,
6.5 to 12 weight-% CaO,
0 to 1.8 weight-% $Al_2O_3$, and
2 to 4.5 weight-% MgO.

The above object is also achieved by a method of producing a headlight lens for a motor vehicle headlight consisting substantially of glass, particularly a headlight lens comprising one or more of the above mentioned features, wherein the headlight lens is blank molded, particularly on both sides, by means of a press and then cooled, particularly controlled and/or with supply of heat and/or in a cooling zone, and/or (immediately) following the pressing process is overflowed with a gas such that at least in the region of an optically effective surface of the headlight lens a layer is formed, which includes an aluminum concentration which is higher than an aluminum concentration inside the headlight lens and/or a sodium concentration which is lower than a sodium concentration inside the headlight lens. Herein overflowing with gas in the sense of the invention includes evaporation. The layer thickness is advantageously in the range between about 50 nm and 300 nm. In a further embodiment of the invention the headlight lens is moved with a velocity between 5 m/h and 10 m/h, preferably 6.5 m/h during the cooling process and/or during overflowing with gas. Herein it is particularly contemplated that the temperature of the headlight lens and its surface, respectively, decreases.

In a further embodiment of the invention the headlight lens is overflowed during the cooling process with a gas containing sulphur, chlorine, fluorine, iron and/or aluminum. Herein the gas can include for example $SO_2$, HCl or $CF_4$—as disclosed in advanced education course 2003 "Oberflächenveredelung von Glas", Hüttentechnische Vereinigung der Deutschen Glasindustrie—or $AlCl_3$—as disclosed in WO 2004/096724 A1. Moreover it can be contemplated that the gas additionally comprises $H_2O$. Appropriate methods for overflowing with gas can be learned from advanced education course 2003 "Oberflächenveredelung von Glas", Hüttentechnische Vereinigung der Deutschen Glasindustrie, WO 2004/096724 A1 and DE 694 00 212 T2. During overflowing with gas the surface temperature of the headlight lens preferably is in the range between 450° C. and 550° C.

In a further embodiment of the invention the gas is sucked off. In a further embodiment of the invention the glass comprises $Na_2O$. In a further embodiment of the invention the glass comprises 2 to 15 weight-% $Na_2O$. In a further embodiment of the invention the glass comprises 50 to 75 weight-% $SiO_2$. In another embodiment of the invention the glass comprises 50 to 75 weight-% $SiO_2$,
2 to 15 weight-% $Na_2O$,
5 to 15 weight-% $K_2O$,
3 to 12 weight-% CaO,
0 to 10 weight-% $B_2O_3$,
0 to 5 weight-% $Al_2O_3$,
0 to 5 weight-% $Li_2O$,
0 to 5 weight-% MgO,
0 to 7 weight-% SrO,
0 to 7 weight-% ZnO,
0 to 8 weight-% $TiO_2$,
0 to 5 weight-% $ZrO_2$,
0.1 to 5 weight-% $Nb_2O_5$,
0 to 5 weight-% $Ta_2O_5$, and
0 to 2 weight-% F.

In a further embodiment of the invention the sum of the amounts of $TiO_2$, $ZrO_2$, $Nb_2O_5$ and $Ta_2O_5$ is between 0.3 and 12 weight-%. In a further embodiment of the invention the sum of the amounts of alkalis is more than 15 weight-%. In a further embodiment of the invention the glass comprises 0 to 2 weight-% PbO. In a still further embodiment of the invention the glass comprises 0 to 2 weight-% BaO.

In a further embodiment of the invention the glass comprises about 13 to 16 weight-% $Na_2O$. In a further embodiment of the invention the glass comprises so called Window glass, wherein the glass comprises about 71 to 73 weight-% $SiO_2$,
13 to 16 weight-% $Na_2O$,
0 to 1 weight-% $K_2O$,
6.5 to 12 weight-% CaO,
0 to 1.8 weight-% $Al_2O_3$, and
2 to 4.5 weight-% MgO.

A headlight lens for a motor vehicle headlight in the sense of the invention is particularly a conventional lens or a lens-like free form. A lens-like free form in this sense for example can be a glass part comprising one or more optical structures adapted for cooperation with one or more light sources of a motor vehicle headlight. A headlight lens for a motor vehicle headlight in the sense of the invention can also be a lens-like optical structure of such a free form.

Insofar a surface comprises a layer in the sense of the invention this should mean that the layer is disposed beneath the surface, particularly beneath the position of the untreated surface. A layer in the sense of the invention is particularly not an applied or deposited layer. A layer in the sense of the invention is particularly a layer converted by ion or atom exchange processes.

BRIEF DESCRIPTION OF THE DRAWINGS

Further advantages and details will be clear from the following description of application examples. In the drawings.

DETAILED DESCRIPTION OF THE DRAWINGS

Figure 1:
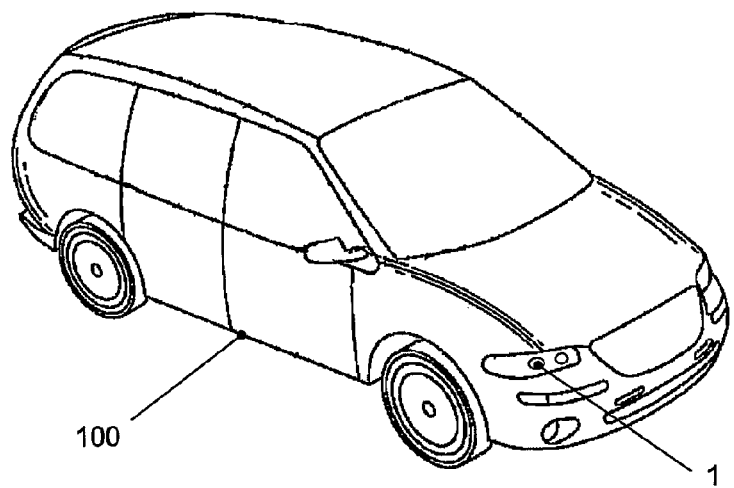
FIG. 1 shows an application example of a motor vehicle.
Figure 2:
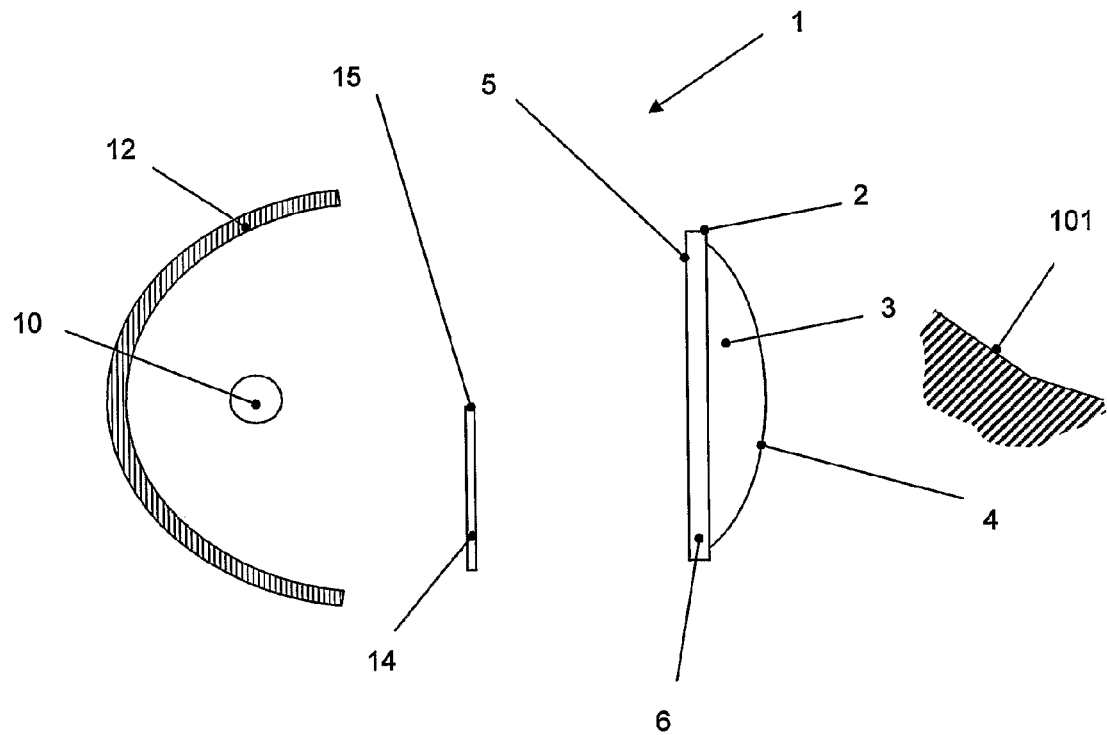
FIG. 2 shows a schematic view of a vehicle headlight.

FIG. 1 shows a motor vehicle 100 comprising a vehicle headlight 1 shown schematically in FIG. 2. The vehicle headlight 1 comprises a light source 10 for generating light, a reflector 12 for reflecting of light producible by means of the light source 10 and an shield 14. The vehicle headlight 1 also comprises a headlight lens 2 for changing the radiation direction of light producible by the light source 10 und for imaging an edge 15 of the shield 14 as a brightness-darkness boundary 101.

The headlight lens 2 includes a lens body 3 comprising an essentially plane surface 5 arranged to face the light source 10 and an essentially convex surface 4 arranged to face away from the light source 10. The headlight lens 2 also comprises an (optional) edge 6 by means of which the headlight lens 2 can be fixed within the vehicle headlight 1.

The headlight lens 2 and the lens body 3, respectively, are made essentially of glass, preferably of DOCTAN®. The glass particularly comprises 50 to 75 weight-% $SiO_2$,
2 to 15 weight-% $Na_2O$,
5 to 15 weight-% $K_2O$,
3 to 12 weight-% CaO,
0 to 10 weight-% $B_2O_3$,
0 to 5 weight-% $Al_2O_3$,
0 to 5 weight-% $Li_2O$,
0 to 5 weight-% MgO,
0 to 7 weight-% SrO,
0 to 7 weight-% ZnO,
0 to 8 weight-% $TiO_2$,
0 to 5 weight-% $ZrO_2$,
0.1 to 5 weight-% $Nb_2O_5$,
0 to 5 weight-% $Ta_2O_5$,
0 to 2 weight-% F,
0 to 2 weight-% PbO, and
0 to 2 weight-% BaO.

In a particularly appropriate embodiment the glass comprises 69 to 70 weight-% $SiO_2$,
1.95 weight-% $Al_2O_3$,
0.55 weight $ZrO_2$,
2.38 weight-% ZnO,
1.72 weight-% $TiO_2$,
8.5 weight-% $K_2O$,
5.3 weight-% CaO
8.52 weight-% $Na_2O$
0.96 weight-% $Li_{2O}$,
1 weight-% BaO, and
0.012 weight-% $Fe_2O_3$.

It can further be contemplated that the glass in a simpler embodiment comprises about 71 to 73 weight-% $SiO_2$,
13 to 16 weight-% $Na_2O$,
0 to 1 weight-% $K_2O$,
6.5 to 12 weight-% CaO,
0 to 1.8 weight-% $Al_2O_3$, and
2 to 4.5 weight-% MgO.

Figure 3:
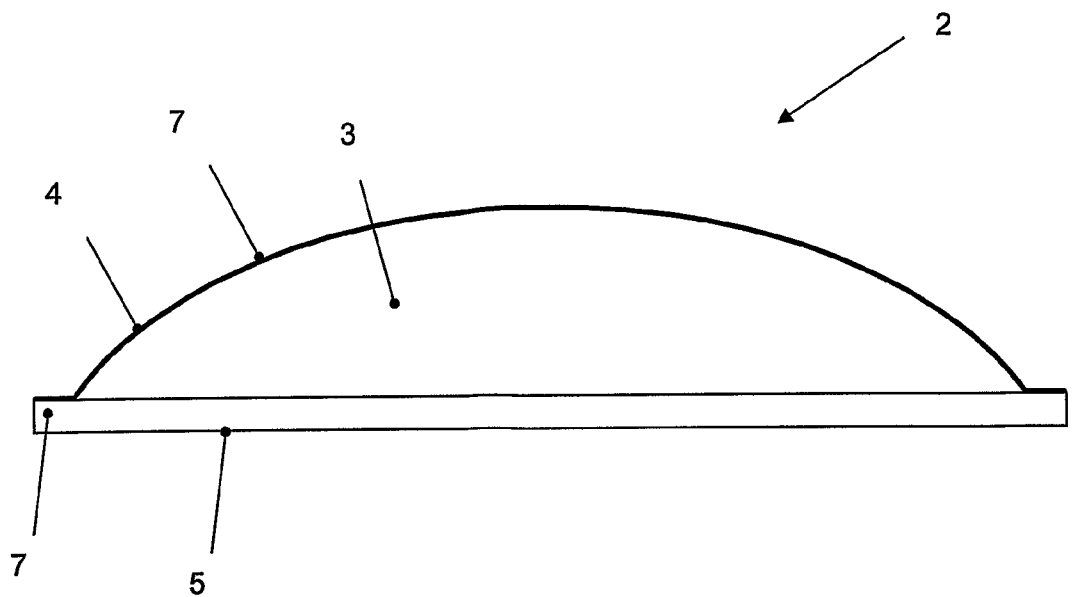
FIG. 3 shows an application example of a headlight lens for a vehicle headlight.
Figure 4:
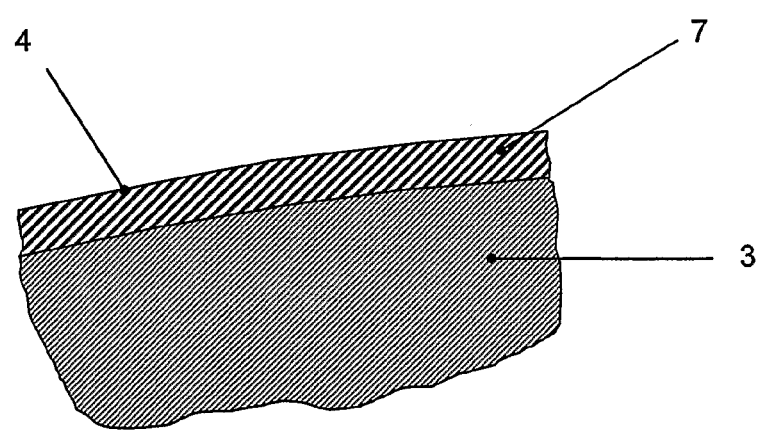
FIG. 4 shows a partial cross-section of the headlight lens of FIG. 3.

FIG. 3 shows the headlight lens 2 in a more detailed representation, and FIG. 4 shows an enlarged partial cross-section of the headlight lens 2. The headlight lens 2 includes at least with respect essentially to the entire convexly curved surface 4 arranged to face away from the light source a layer 7 comprising an aluminum concentration which is higher than the aluminum concentration inside the lens body 3 and/or a sodium concentration that is lower than a sodium concentration inside the lens body 3. The thickness of layer 7 preferably is in the range between 50 nm and 300 nm.

Figure 5:
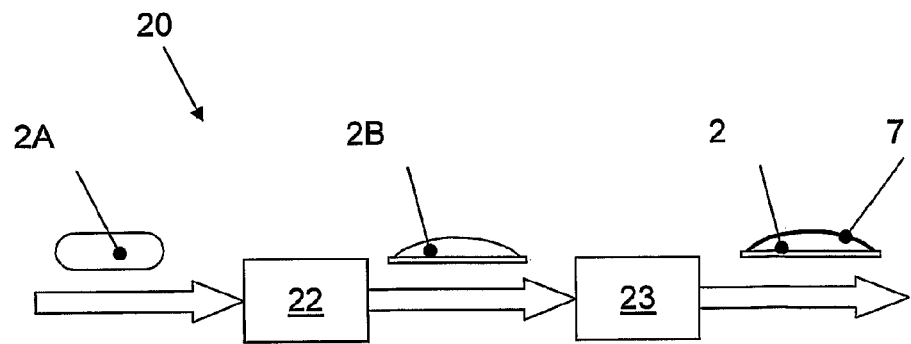
FIG. 5 shows a general arrangement drawing of a device for manufacturing a headlight lens for a motor headlight consisting mainly of glass.

FIG. 5 shows a method and a device 20 for producing headlight lenses, such as headlight lens 2. The device 20 for producing headlight lenses comprises a press 22 by means of which a heated preform 2A made of glass, such as a gob or a preform close to final contours (a preform close to final contours has a contour which is very similar to the contour of the headlight lens to be pressed), is pressed (in a single pressing step) into the desired headlight lens 2B. Herein the headlight lens 2B is preferably blank molded (on both sides).

Figure 6:
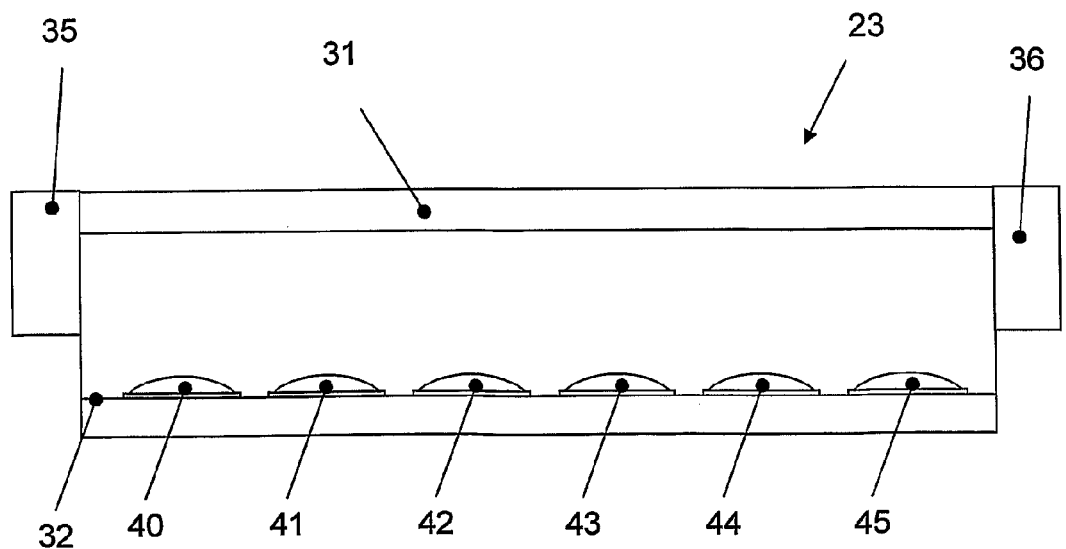
FIG. 6 shows a general arrangement drawing of a cooling zone.

Following the pressing step the headlight lens 2B is transferred to a cooling zone 23 shown in a general arrangement drawing in FIG. 6 by means of which the headlight lens 2B is cooled down (in a singe cooling step) by controlled heat supply and by means of which the surface of the headlight lens 2B is treated. At the exit of the cooling zone 23 a headlight lens 2 including a layer 7 is outputted, wherein the headlight lens 2 preferably has a temperature of less than 100° C., more preferably of approximately 50° C. In the cooling zone 23 or during the cooling process the headlight lens 2B is moved particularly with a velocity between 5 m/h and 10 m/h, preferably with a velocity of 6.5 m/h.

The cooling zone 23 includes a cooling belt 32 on which headlight lenses 40, 41, 42, 43, 44, 45 corresponding to the headlight lens 2 pass the cooling zone 23. The cooling zone 23 also includes a gas outlet means 31 by means of which the headlight lenses 40, 41, 42, 43, 44, and 45 are overflowed with a gas (or vapour/vapour phase) during the cooling process such that a layer corresponding to layer 7 is formed. In a preferred embodiment the headlight lenses 40, 41, 42, 43, 44, 45 and 2 and 2B, respectively, are overflowed with a gas containing sulphur, chlorine, fluorine, iron and/or aluminum. Herein the gas can include for example $SO_2$, HCl or $CF_4$—as disclosed in advanced education course 2003 "Oberflächenveredelung von Gas", Hüttentechnische Vereinigung der Deutschen Glasindustrie—or $AlCl_3$—as disclosed in WO 2004/096724 A1. Further it can be contemplated that the gas includes or contains $H_2O$. Appropriate methods for overflowing with gas can be learned from advanced education course 2003 "Oberflächenveredelung von Gas", Hüttentechnische Vereinigung der Deutschen Glasindustrie, WO 2004/096724 A1 and DE 694 00 212 T2. During overflowing with gas the surface temperature of the headlight lens 40, 41, 42, 43, 44, 45 and 2, respectively, preferably lies in the range between 450° C. and 550° C.

In a further embodiment of the invention the gas is sucked off. For this purpose there can be provided suction means 35, 36 examples of which are shown in FIG. 6. Corresponding suction means can also be provided beneath cooling zone 23.

The device for producing headlight lenses described with reference to FIG. 5 can comprise a melting aggregate for melting glass disposed upstream of press 22, such as a tub or pan. Said melting aggregate for example can include an adjustable outlet from which liquid glass is transferred in a downstream preform device for producing a preform. Said preform device for example can include moulds into which a predefined amount of glass is poured. Upstream of press 22 a tempering means can be disposed by means of which the temperature gradient of the preform is inverted.

The device 1 for producing headlight lenses described with reference to FIG. 5 can comprise a control assembly (not shown) for controlling or adjusting the device 1 shown in FIG. 5. Herein the control means preferably provides for a continuous link between the individual process steps.

By means of the method described above a layer corresponding to layer 7 can be formed alternatively or additionally beneath the essentially plane surface 5 arranged to face the light source 10.

The invention claimed is:

1. Vehicle headlight lens for imaging an edge of a shield as a brightness-darkness-boundary, the vehicle headlight lens comprising:
    a transparent lens body made of glass, the transparent lens body including:
    a substantially plane surface; and
    a convexly curved surface, wherein the convexly curved surface includes one of the group of
    a layer comprising an aluminum concentration which is higher than an aluminum concentration inside the lens body; and
    a layer comprising a sodium concentration which is lower than a sodium concentration inside the lens body.

2. Vehicle headlight lens according to claim 1, the vehicle headlight lens being blank molded.

3. Vehicle headlight lens according to claim 1, wherein the glass comprises $Na_2O$.

4. Vehicle headlight lens according to claim 3, the glass comprises 2 to 15 weight-% $Na_2O$.

5. Vehicle headlight lens according to claim 3, wherein the glass comprises
    50 to 75 weight-% $SiO_2$,
    2 to 15 weight-% $Na_2O$,
    5 to 15 weight-% $K_2O$,
    3 to 12 weight-% CaO,
    0 to 10 weight-% $B_2O_3$,
    0 to 5 weight-% $Al_2O_3$,
    0 to 5 weight-% $Li_2O$,
    0 to 5 weight-% MgO,
    0 to 7 weight-% SrO,
    0 to 7 weight-% ZnO,
    0 to 8 weight-% $TiO_2$,
    0 to 5 weight-% $ZrO_2$,
    0.1 to 5 weight-% $Nb_2O_5$,
    0 to 5 weight-% $Ta_2O_5$, and
    0 to 2 weight-% F.

6. Vehicle headlight lens according to claim 5, wherein the glass comprises 13 to 16 weight-% $Na_2O$.

7. Vehicle headlight lens according to claim 3, wherein the glass comprises 13 to 16 weight-% $Na_2O$.

8. Vehicle headlight lens according to claim 3, wherein the glass comprises about
    71 to 73 weight-% $SiO_2$,
    13 to 16 weight-% $Na_2O$,
    0 to 1 weight-% $K_2O$,
    6.5 to 12 weight-% CaO,
    0 to 1.8 weight-% $Al_2O_3$, and
    2 to 4.5 weight-% MgO.

9. Vehicle headlight comprising:
    a light source; and
    a vehicle headlight lens for imaging an edge of a shield located between the light source and the vehicle headlight lens as a brightness-darkness-boundary, the vehicle headlight lens comprising:
    a transparent lens body made of glass, the transparent lens body including:
    a surface facing the light source; and
    a surface facing away from the light source and including one of the group of a layer comprising an aluminum concentration which is higher than an aluminum concentration inside the lens body; and
    a layer comprising a sodium concentration which is lower than a sodium concentration inside the lens body.

10. Vehicle headlight according to claim 9, the vehicle headlight lens being blank molded.

11. Vehicle headlight according to claim 9, wherein the glass comprises $Na_2O$.

12. Vehicle headlight according to claim 11, the glass comprises 2 to 15 weight-% $Na_2O$.

13. Vehicle headlight according to claim 11, wherein the glass comprises
    50 to 75 weight-% $SiO_2$,
    2 to 15 weight-% $Na_2O$,
    5 to 15 weight-% $K_2O$,
    3 to 12 weight-% CaO,
    0 to 10 weight-% $B_2O_3$,
    0 to 5 weight-% $Al_2O_3$,
    0 to 5 weight-% $Li_2O$,
    0 to 5 weight-% MgO,
    0 to 7 weight-% SrO,
    0 to 7 weight-% ZnO,
    0 to 8 weight-% $TiO_2$,
    0 to 5 weight-% $ZrO_2$,
    0.1 to 5 weight-% $Nb_2O_5$,
    0 to 5 weight-% $Ta_2O_5$, and
    0 to 2 weight-% F.

14. Vehicle headlight according to claim 9, wherein the glass comprises 13 to 16 weight-% $Na_2O$.

15. Vehicle headlight according to claim 11, wherein the glass comprises 13 to 16 weight-% $Na_2O$.

16. Vehicle headlight according to claim 11, wherein the glass comprises about
71 to 73 weight-% $SiO_2$,
13 to 16 weight-% $Na_2O$,
0 to 1 weight-% $K_2O$,
6.5 to 12 weight-% CaO,
0 to 1.8 weight-% $Al_2O_3$, and
2 to 4.5 weight-% MgO.

17. Vehicle headlight lens for imaging an edge of a shield as a brightness-darkness-boundary, the vehicle headlight lens comprising:
a transparent lens body made of glass, the transparent lens body including:
a surface arranged to face the light source; and
a surface arranged to face away from the light source and including one of the group of
a layer comprising an aluminum concentration which is higher than an aluminum concentration inside the lens body; and
a layer comprising a sodium concentration which is lower than a sodium concentration inside the lens body.

18. Vehicle headlight lens according to claim 17, the vehicle headlight lens being blank molded.

19. Vehicle headlight lens according to claim 17, wherein the glass comprises $Na_2O$.

20. Vehicle headlight lens according to claim 17, the glass comprises 2 to 15 weight-% $Na_2O$.

21. Vehicle headlight lens according to claim 17, wherein the glass comprises
50 to 75 weight-% $SiO_2$,
2 to 15 weight-% $Na_2O$,
5 to 15 weight-% $K_2O$,
3 to 12 weight-% CaO,
0 to 10 weight-% $B_2O_3$,
0 to 5 weight-% $Al_2O_3$,
0 to 5 weight-% $Li_2O$,
0 to 5 weight-% MgO,
0 to 7 weight-% SrO,
0 to 7 weight-% ZnO,
0 to 8 weight-% $TiO_2$,
0 to 5 weight-% $ZrO_2$,
0.1 to 5 weight-% $Nb_2O_5$,
0 to 5 weight-% $Ta_2O_5$, and
0 to 2 weight-% F.

22. Vehicle headlight lens according to claim 17, wherein the glass comprises about
71 to 73 weight-% $SiO_2$,
13 to 16 weight-% $Na_2O$,
0 to 1 weight-% $K_2O$,
6.5 to 12 weight-% CaO,
0 to 1.8 weight-% $Al_2O_3$, and
2 to 4.5 weight-% MgO.

23. Method of producing a vehicle headlight lens for imaging an edge of a shield as a brightness-darkness-boundary; the method comprising the steps of:
blank molding the headlight lens consisting essentially of glass; and
subsequently cooling the headlight lens;
overflowing the headlight lens during the cooling process with a gas containing at least one of the group of sulphur, chlorine, fluorine, iron and aluminum.

24. Method according to claim 23, wherein the gas comprises at least one of the group of HCl, $CF_4$ and $AlCl_3$.

25. Method according to claim 23, wherein the gas is sucked off.

* * * * *